(12) United States Patent
Henmi

(10) Patent No.: US 8,545,271 B2
(45) Date of Patent: Oct. 1, 2013

(54) WIRING APPARATUS

(75) Inventor: Fumitoshi Henmi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/394,580

(22) PCT Filed: Sep. 22, 2010

(86) PCT No.: PCT/JP2010/067013
§ 371 (c)(1),
(2), (4) Date: Mar. 7, 2012

(87) PCT Pub. No.: WO2011/037268
PCT Pub. Date: Mar. 31, 2011

(65) Prior Publication Data
US 2012/0171908 A1    Jul. 5, 2012

(30) Foreign Application Priority Data

Sep. 24, 2009    (JP) .................................. 2009-219567

(51) Int. Cl.
*H01R 24/00*    (2011.01)
(52) U.S. Cl.
USPC ............................. 439/627; 439/504; 439/208
(58) Field of Classification Search
USPC ............. 174/48, 49, 50, 72 A; 439/207–216, 439/504, 627
See application file for complete search history.

(56) References Cited

U.S. PATENT DOCUMENTS

| 6,261,719 | B1 * | 7/2001 | Ikeda et al. ................... 429/211 |
| 6,300,561 | B1 | 10/2001 | Saito et al. |
| 7,077,704 | B2 * | 7/2006 | Ikeda et al. ................... 439/627 |
| 2004/0043663 | A1 | 3/2004 | Ikeda et al. |
| 2012/0171908 | A1 * | 7/2012 | Henmi .......................... 439/761 |
| 2012/0211480 | A1 * | 8/2012 | Henmi .......................... 219/201 |

FOREIGN PATENT DOCUMENTS

| EP | 0986114 A1 | 3/2000 |
| JP | 200495381 A | 3/2004 |

OTHER PUBLICATIONS

International Search Report (PCT/ISA/210) issued on Apr. 20, 2011 in the International Patent Application No. PCT/JP2010/067013.
Written Opinion (PCT/ISA/237) issued on Apr. 20, 2011 in the International Patent Application No. PCT/JP2010/067013.

* cited by examiner

*Primary Examiner* — James Harvey
(74) *Attorney, Agent, or Firm* — Sughrue Mion, PLLC

(57) ABSTRACT

A wiring apparatus includes a wire housing portion, terminal housing chambers and wire extracting portions. The wire housing portion is provided with a plurality of elongated housing grooves that respectively house wires therein and are disposed in parallel to each other, each of the grooves is divided at one or more portions by groove(s), and side walls and are coupled by a U-shaped elastic coupling member. Each terminal housing chamber houses a conductive metal plate for coupling the terminal of the battery and the terminal of the adjacent battery and couples adjacent terminal housing chambers and by a U-shaped elastic coupling member. Each of the wire extracting portions couples a wire housing groove and the terminal housing chamber to thereby extract the wire to the wire housing groove.

4 Claims, 6 Drawing Sheets

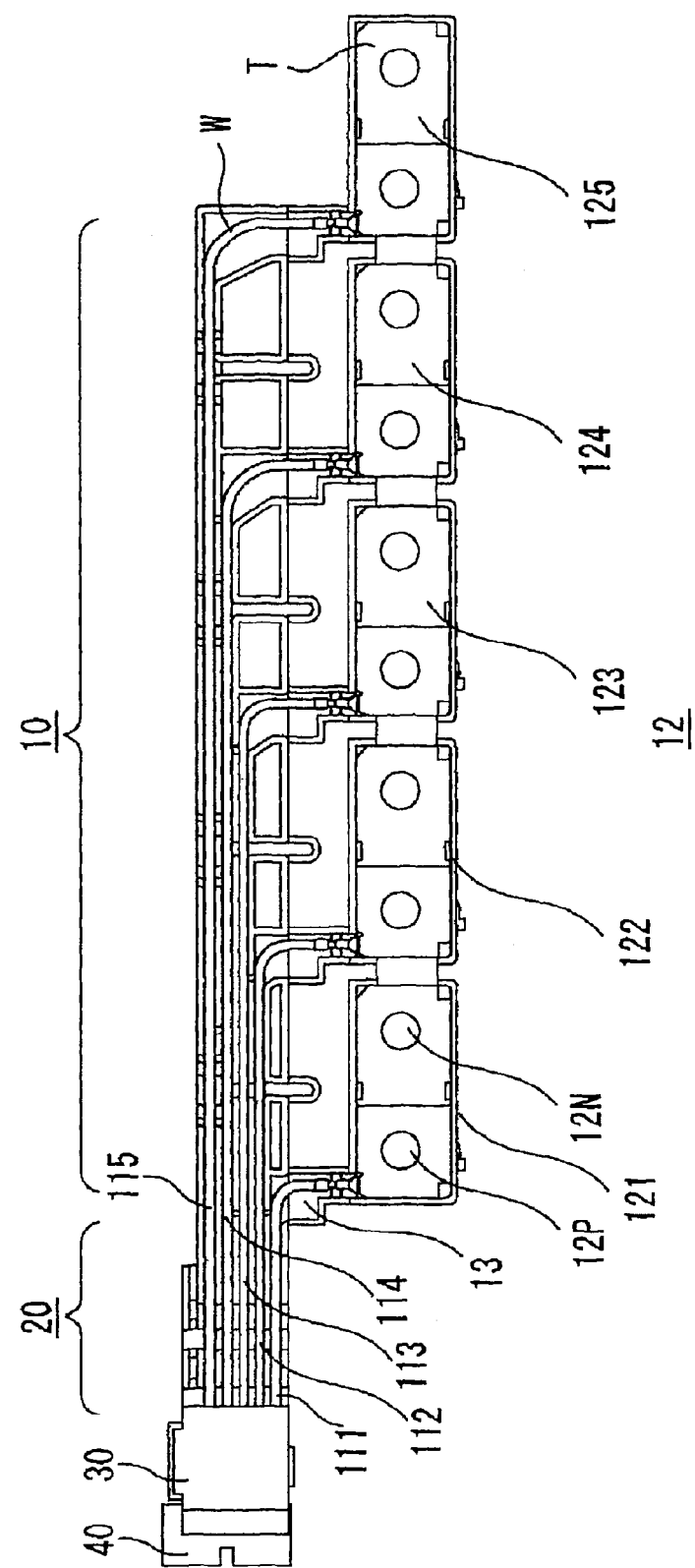

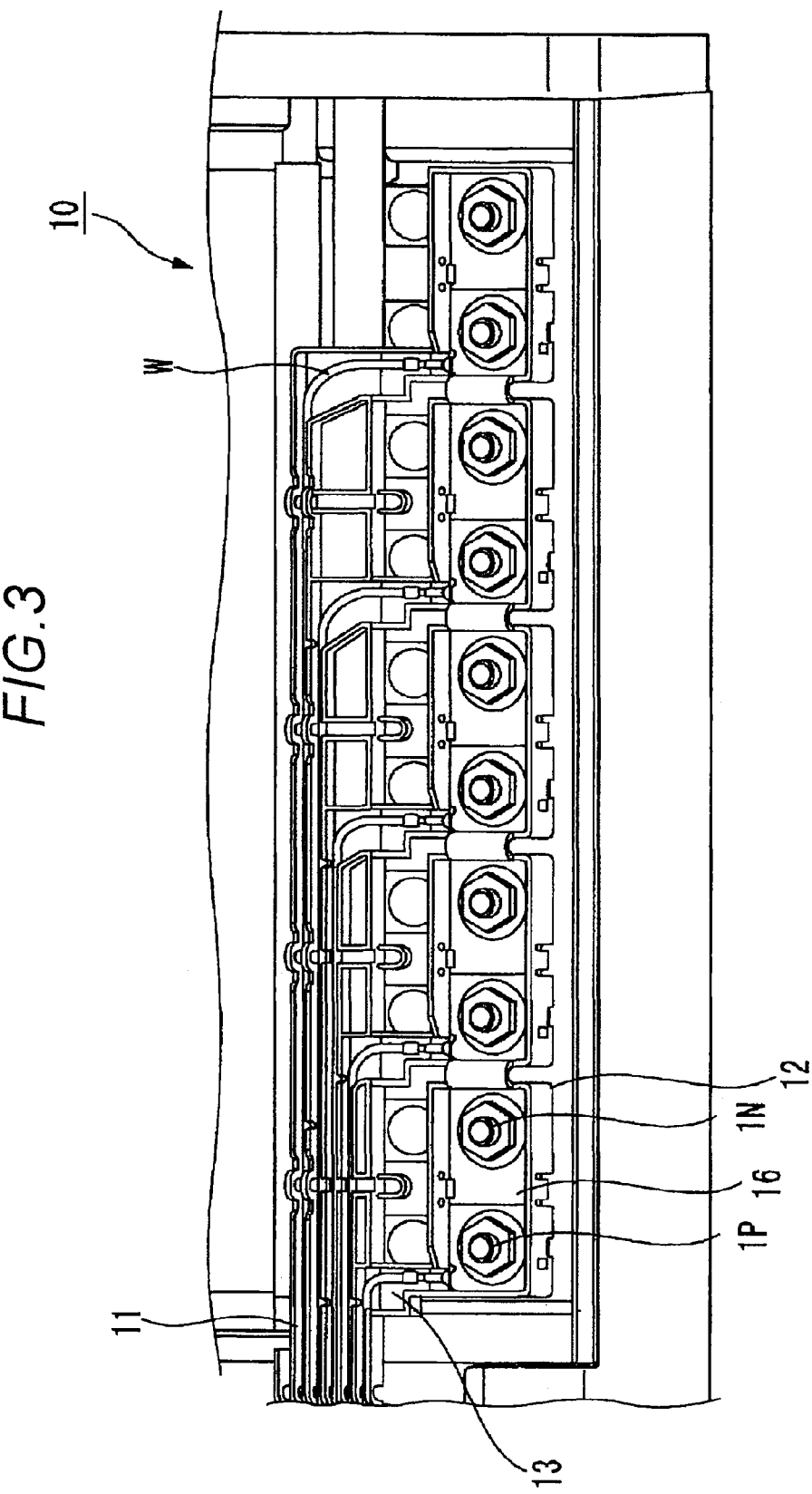

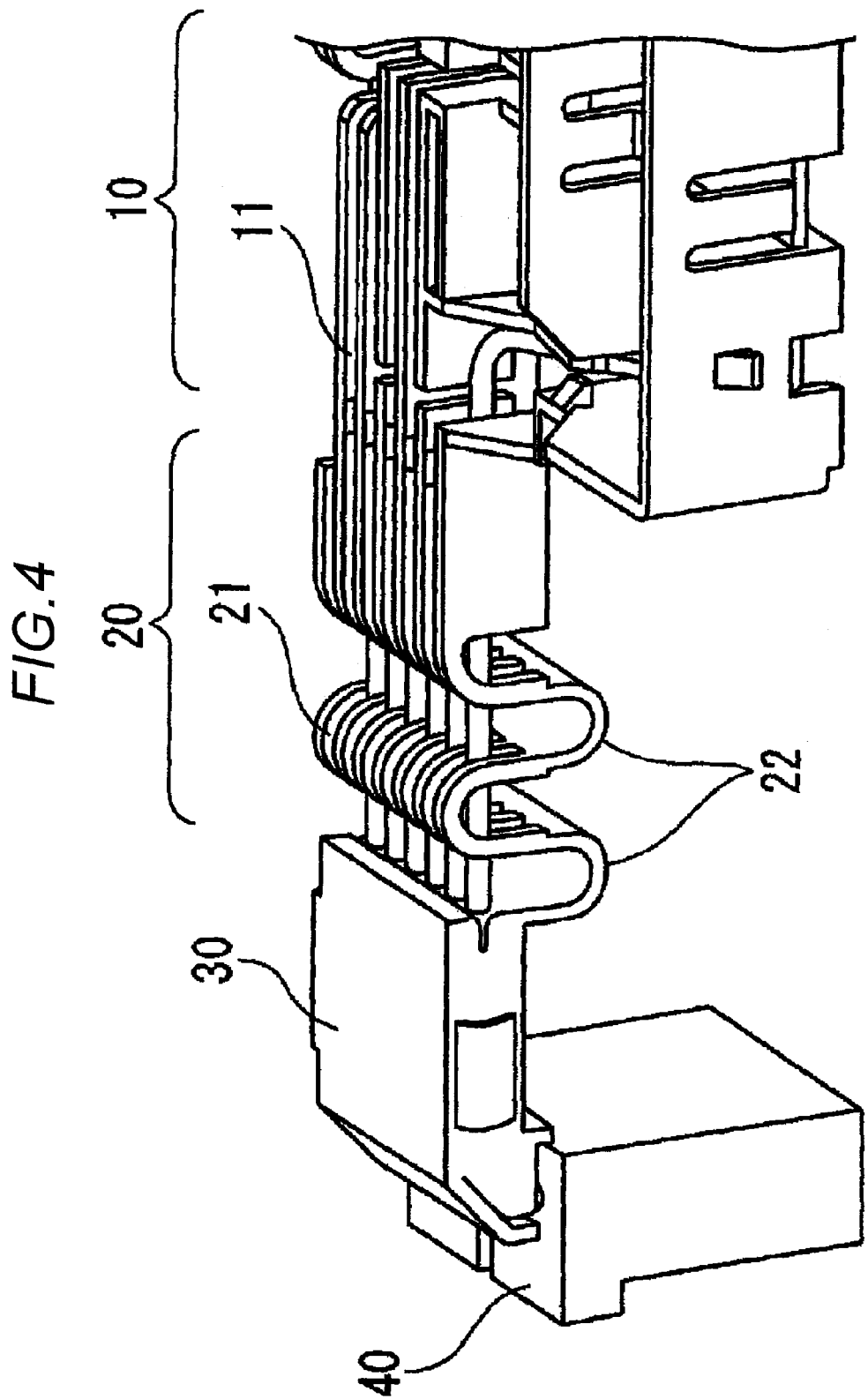

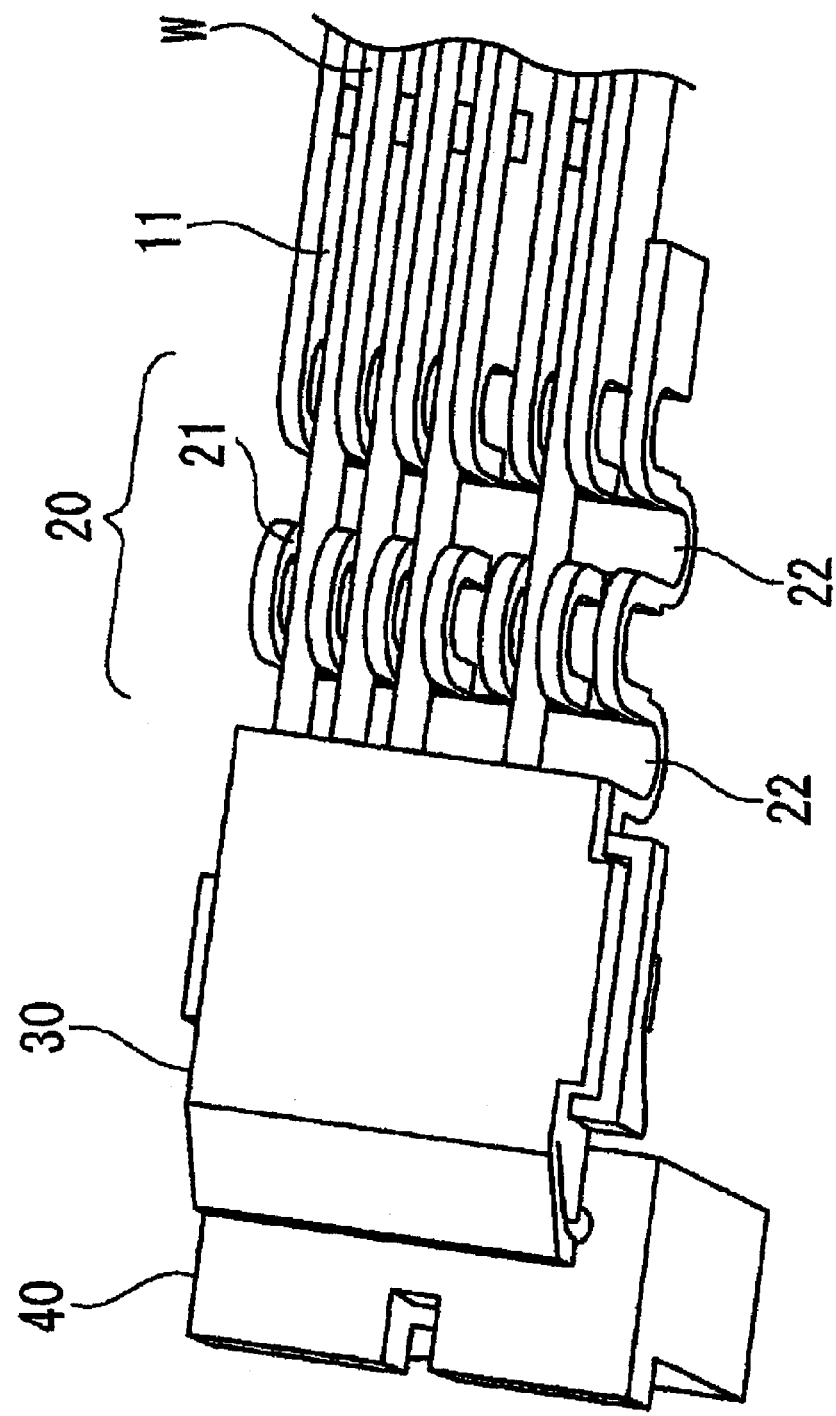

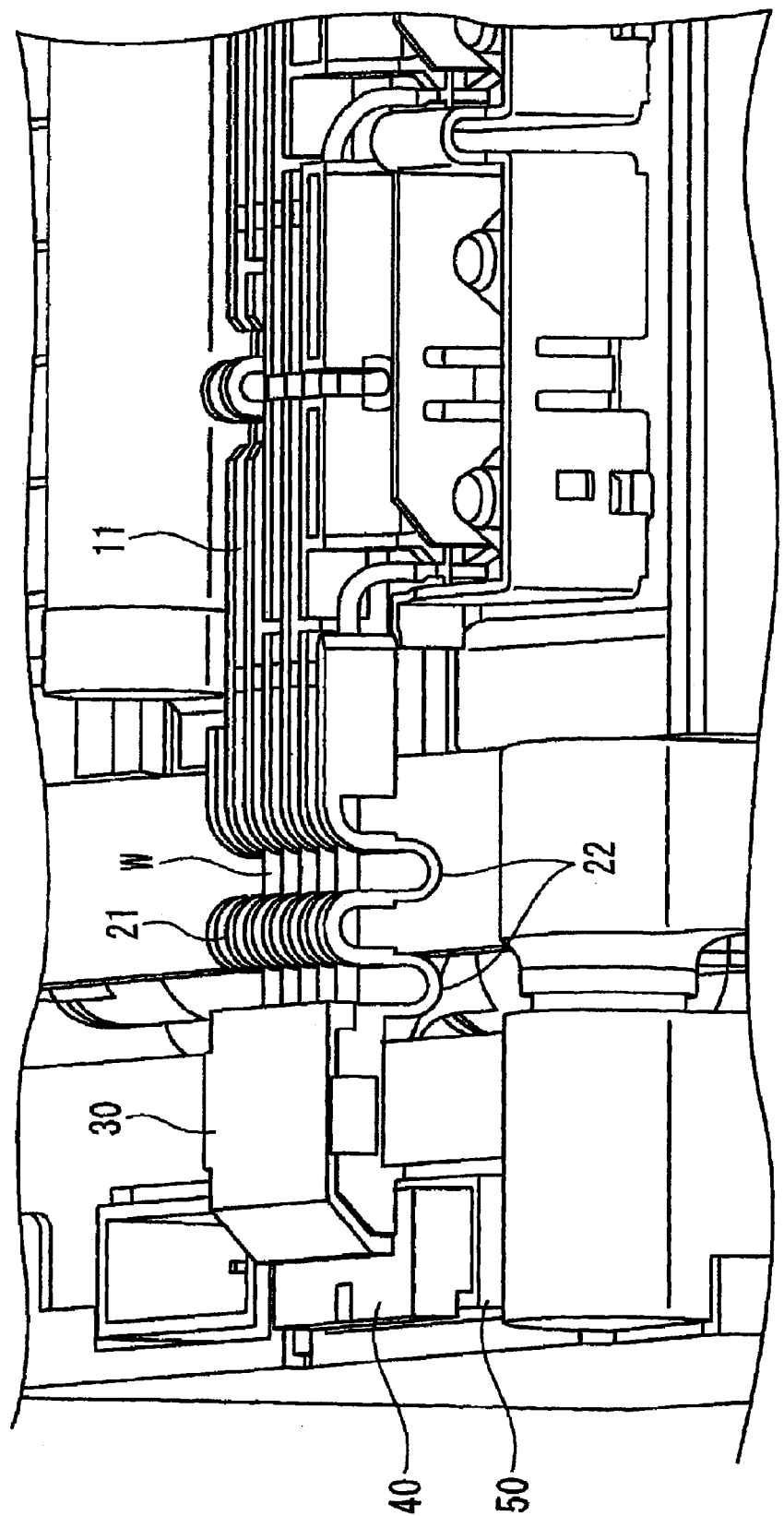

WIRING APPARATUS

TECHNICAL FIELD

The present invention relates to a wiring apparatus used for an electric vehicle mounting lithium ion batteries thereon particularly and, in more detail, relates to a wiring apparatus which is arranged to avoid the direct contact between wires and to compensate the tolerance of a battery pitch and the design error of a distance to a PCB (printed circuit board) assembly attached to the side of a battery module from the battery module.

BACKGROUND ART

Wiring Apparatus Described in Patent Literature 1

A wiring apparatus for compensating a positional deviation between a battery and an electronic part is known (see Patent Literature 1). The configuration described in Patent Literature 1 includes a plate body mounted on batteries that are aligned, terminals that are mounted on the plate body and couple the batteries with electric components, and a cover for mounting the terminals on the plate body, wherein each of the terminals is provided with a size difference compensating portion for compensating the positional deviation between the battery and the electronic component.

To be concrete, the size difference compensating portion is configured by an elongated, substantially crank-shaped notch portion which is extended from the one side surface of a rectangular metal terminal along the one side surface and provided with an elongated, substantially crank-shaped flexible leg portion at the tip end of the notch portion.

<Merit of the Configuration Described in Patent Literature 1>

According to such the configuration, the positional deviation between the battery and the electronic component provided adjacent to the battery can be surely compensated by the bending operation of the elongated flexible leg portion provided at the metal terminal.

Further, since overcurrent prevention resistor elements adapted to cope with an overcurrent generated from the battery are used as the electronic components, the overcurrent prevention resistor elements can detect an abnormality such as the overcurrent flowing from the battery at the time of charging the battery or flowing the current from the battery.

<Problems of the Configuration Described in Patent Literature 1>

The configuration described in Patent Literature 1 is effective for a nickel-hydrogen battery. That is, in the case of the nickel-hydrogen battery, since the voltage detection is required only once for a plurality of the batteries, the required number of the overcurrent prevention resistor elements is small. In contrast, in the case of the lithium ion battery, the voltage detection is required once for each of the battery cells. Thus, according to the configuration described in Patent Literature 1, since the number of times of using the overcurrent prevention resistor elements increases, the cost of the apparatus increases.

Further, the configuration described in Patent Literature 1 can compensate the positional deviation between the battery and the electronic component provided adjacent to the battery, but can not effectively compensate the tolerance of the battery pitch and the design error of a distance to a PCB assembly attached to the side of a battery module from the battery module.

Furthermore, voltage detection wires extracted from the batteries are bound into a bundle, then the bound wires are wired and coupled to a connector at the tip ends thereof. Thus, since the wires are directly made in contact, there may arise a short-circuit between the wires.

In this case, each of the wires is required to be covered by a protection member such as a corrugate or a tube in order to prevent the short-circuit, which results in the increase of the time and labor. Further, the wires are bound into the bundle, so that there arises a problem in a point of the maintenance since it is difficult to quickly and accurately recognize as to which one of the wires of the connector side is coupled to which one of the batteries.

CITATION LIST

Patent Literature

Patent Literature 1: JP-A-2004-95381

SUMMARY OF INVENTION

Technical Problem

The present invention is made in order to solve the problems of the related art and an object of the invention is to provide a wiring apparatus which is arranged to be effective particularly in the case where a lithium ion battery is used for the battery, to compensate the tolerance of each battery pitch of a plurality of batteries and the design error of a distance to a PCB assembly attached to the side of a battery module from the battery module, to avoid the direct contact between wires, to obviously recognize the coupling relation between the wires on the connector side and the batteries and to be suitable for performing the maintenance.

Solution to Problem

In order to achieve the object, a first aspect of the present invention provides a wiring apparatus formed by a plastic molding and including a wire housing portion, terminal housing chambers and wire extracting portions, wherein the wire housing portion is provided with a plurality of elongated housing grooves that respectively house wires therein and that are disposed in parallel to each other, each of the housing grooves is divided at one or more pieces in a longitudinal direction, and adjacent end portions of each pair of adjacent divided pieces of the housing groove are coupled by a U-shaped elastic coupling member, the terminal housing chambers are arranged to each house a conductive metal plate for coupling a terminal of a battery and a terminal of another battery adjacent thereto, and to be disposed in a separate manner along the longitudinal direction of the wire housing portion, and each pair of the adjacent terminal housing chambers disposed separately is coupled by a U-shaped elastic coupling member, and each of the wire extracting portions is arranged to couple corresponding one of the housing grooves and corresponding one of the terminal housing chambers to thereby extract one of the wires to the corresponding housing groove from the corresponding terminal housing chamber.

In a second aspect of the present invention, in the wiring apparatus according to the first aspect, the wire housing portions are respectively provided with projections, each of which acts to lock and prevent the wire housed in the respective wire housing portions from being extruded therefrom.

In a third aspect of the present invention, in the wiring apparatus according to the first aspect, each of the U-shaped elastic coupling members for coupling the adjacent end portions of each pair of adjacent divided pieces of the housing groove is respective one of a vertical coupling member for coupling upper end portions of the adjacent end portions and a horizontal coupling member for coupling side end portions of the adjacent end portions.

In a fourth aspect of the present invention, in the wiring apparatus according to the first aspect, the wire housing portion is provided at a portion thereof to be coupled to a connector with a hinge portion which is formed to be bent in a W-shape having three bent portions when seen from a direction crossing the wire housing portion.

Advantageous Effects of Invention

According to the first aspect, the elongated housing groove for housing the wire therein is divided at one or more pieces and the adjacent end portions of each pair of the adjacent divided pieces of the housing groove are coupled by the U-shaped elastic coupling member. Thus, even if there is a tolerance of the battery pitch, the tolerance can be compensated by the shrink or expansion of the U-shaped elastic coupling member. Accordingly, since a stress is not applied to the voltage detection wire housing portions, the strong voltage detection wire housing portions capable of withstanding for a long term use can be obtained.

According to the second aspect, each of the wire housing portions is provided therein with a projection, each of which acts to lock and prevent the wire housed in the wire housing portion from being extruded therefrom. Thus, the wire housed within the wire housing portion is prevented from extruding from the housing groove accidentally, so that the wires can be housed stably and so an unexpected accident does not arise.

According to the third aspect, preferable one of the vertical coupling member and the horizontal coupling member can be selected in view of the circumferential state as the U-shaped elastic coupling member for coupling the adjacent end portions.

According to the fourth aspect, the wire housing portion is provided at the portion thereof to be coupled to the connector with the hinge portion which is formed to be bent in the W-shape when seen from the direction crossing the wire housing portion. Thus, even if there is the tolerance of the battery pitch as to the batteries or the design error of a distance between the battery and the connector, such the tolerance and the design error can be compensated. Further, since the attachment angle of the connector can be changed, the attachment angle of the connector can be coped flexibly.

BRIEF DESCRIPTION OF DRAWINGS

FIG. 2 is a plan view showing a state where wires are wired in the wiring apparatus of FIG. 1.

FIG. 3 is a perspective view showing a state where the wiring apparatus of FIG. 2 is coupled to battery terminals.

FIG. 4 is a perspective view showing a connector coupling portion of a wiring apparatus according to a second embodiment of the invention.

FIG. 5 is a perspective view of the connector coupling portion of FIG. 4 seen from the upper direction.

FIG. 6 is a perspective view showing a state where the connector of the second embodiment is attached to a PCB assembly.

DESCRIPTION OF EMBODIMENTS

Figure 1:
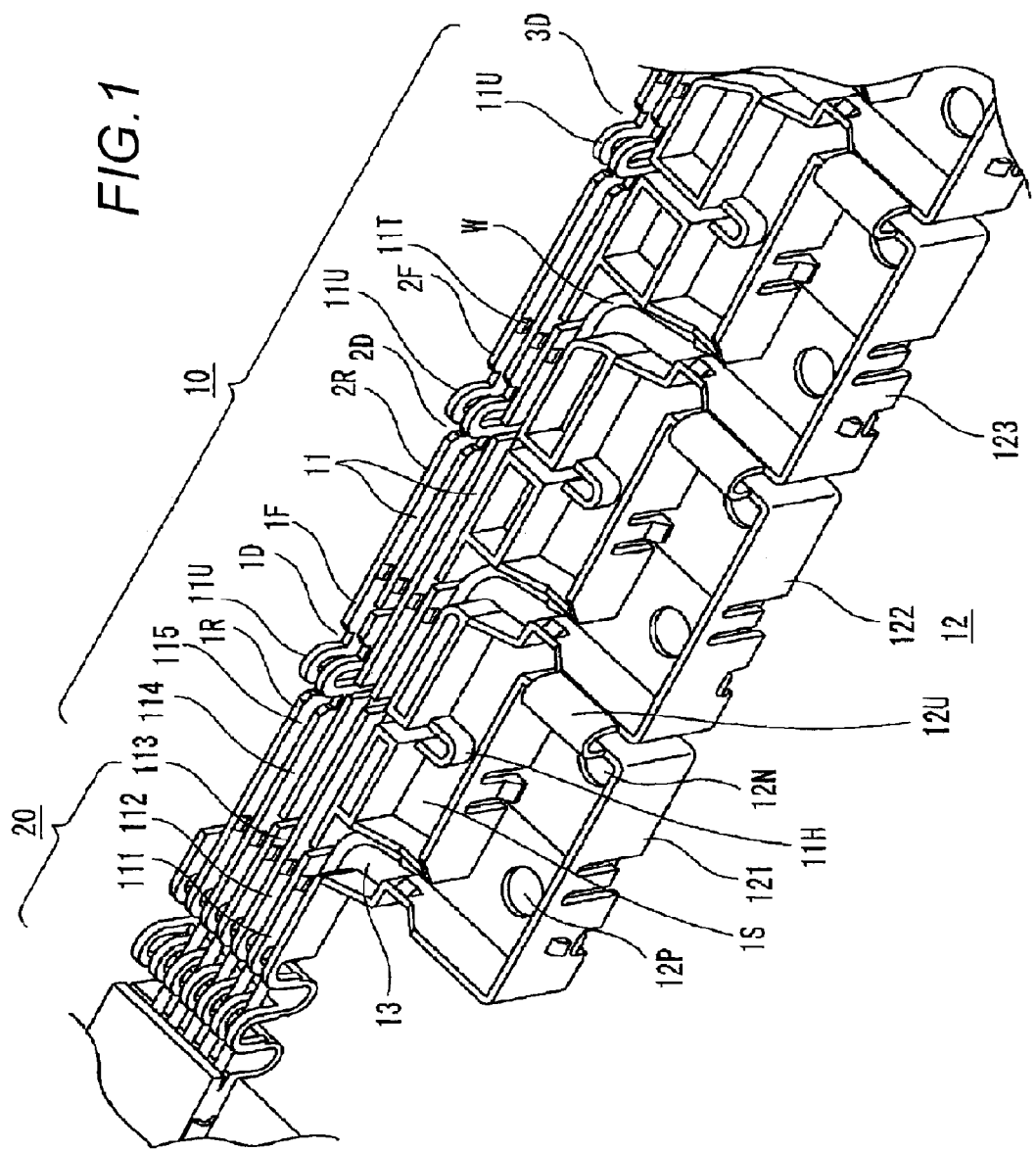
FIG. 1 is a perspective view showing a wiring apparatus according to a first embodiment of the invention.

Hereinafter, the explanation will be made with reference to drawings as to a wiring apparatus which is arranged to be effective particularly in the case where a lithium ion battery is used for battery, to compensate the tolerance of each battery pitch of a plurality of the batteries and the design error of a distance to a PCB assembly attached to the side of a battery module from the battery module, to avoid the direct contact between wires, to obviously recognize the coupling relation between the wires on the connector side and the batteries and to be suitable for performing the maintenance.

First Embodiment

<Configuration of Wiring Apparatus According to First Embodiment>

A wiring apparatus 10 according to a first embodiment shown in FIG. 1 is entirely formed by a plastic molding and is configured by a voltage detection wire housing portion 11, a terminal housing chamber 12 for housing battery terminals, and voltage detection wire extracting portions 13 for coupling the voltage detection wire housing portion 11 with the terminal housing chamber 12. Hereinafter, the explanation will be made as to the voltage detection wire housing portion 11, the terminal housing chamber 12 and the voltage detection wire extracting portions 13 in this order.

<Reason why Voltage Detection Wire Housing Portion 11 is Necessary>

In the case where the lithium ion battery is used for battery, according to the invention, instead of using an overcurrent prevention resistor element for each of the cells of the lithium ion batteries, a voltage detection wire is extracted for each of the cells of the lithium ion batteries and coupled to a connector, and the voltage detection wires are sequentially coupled to a common voltage detection resistor element mounted on a printed circuit via the connector in a time-sharing manner. Then, a current flowing through the common voltage detection resistor element is compared by a CPU to determine whether or not an overcurrent is generated from the lithium ion batteries. According to such the configuration, since it is not necessary to provide the overcurrent prevention resistor element for each of the cells of the lithium ion batteries, the total cost of the apparatus can be reduced.

In this case, the voltage detection wire is required for each of the cells of the lithium ion batteries. Thus, in order to prevent the short-circuit due to the mutual contact between the voltage detection wires, it may become necessary to cover each of the voltage detection wires by a protection member such as a corrugate or a tube and further to bound and fix all the voltage detection wires each thus covered by a tape or a band.

However, the present invention is arranged so as to eliminate such the procedures of covering and binding the voltage detection wires and to provide a voltage detection wire housing portion configured in the following manner. As a consequence, it becomes unnecessary to cover each of the voltage detection wires by the protection member such as the corrugate or the tube and also unnecessary to bound and fix all the voltage detection wires each thus covered by the tape or the band.

<Configuration of Voltage Detection Wire Housing Portion 11>

In order to wire the voltage detection wires extracted from the respective batteries to the connector 40 side in parallel from one another without directly contacting to each other, the voltage detection wire housing portion 11 is provided with a plurality of wire housing grooves 111, 112, 113 which are disposed in parallel to each other along the alignment of the batteries to the connector 40 from the respective batteries. Each of the wire housing grooves 111, 112, 113 is not arranged to be a straight continuous groove extending from the corresponding battery to the connector 40 but is arranged in a manner that each of the wire housing grooves is divided at least once in corresponding to each battery. The upper portions of the adjacent side walls in each of divided grooves 1D, 2D, 3D are coupled by a U-shaped elastic coupling member 11U.

To be concrete, a front side wall 1F and a rear side wall 1R sandwiching the dividing groove 1D are coupled by a U-shaped elastic coupling member 11U, a front side wall 2F and a rear side wall 2R sandwiching the dividing groove 2D are coupled by another U-shaped elastic coupling member 11U, and a front side wall 3F and a rear side wall 3R sandwiching the dividing groove 2D are coupled by another U-shaped elastic coupling member 11U.

<Modified Example of U-Shaped Elastic Coupling Member>

In the aforesaid explanation, the U-shaped elastic coupling member 11U for coupling the adjacent side walls of the dividing groove is provided at the position for coupling the upper portions of the adjacent side walls sandwiching the dividing groove 1D. However, at a position where a dead space 1S is provided in the width direction, it is preferable to provide a horizontal U-shaped elastic coupling member 11H which couples the side surface portions of the adjacent side walls of the dividing groove 1D as shown in FIGS. 1 to 3.

<Effects of U-Shaped Elastic Coupling Members 11U, 11H>

In this manner, since each of the wire housing grooves 111, 112, 113 of the voltage detection wire housing portion 11 is divided at least once in corresponding to each battery and the adjacent side walls sandwiching each of the dividing grooves are coupled by the U-shaped elastic coupling member 11U or 11H, each of the U-shaped elastic coupling members forms "a battery pitch tolerance compensation portion". Thus, even when there is a tolerance of a battery pitch at each of the batteries, the tolerance can be compensated by the shrink or expansion of the U-shaped elastic coupling member 11U or 11H. As a result, since no stress is applied to each of the portions 11, the strong voltage detection wire housing portion 11 capable of withstanding for a long term use can be obtained and so also the strong wiring apparatus 10 capable of withstanding for a long term use can be obtained.

<Improvement of Voltage Detection Wire Housing Portion 11>

A projection (lock) 11T may be provided at the side wall of each of the wire housing grooves 111, 112, 113, 114 and 115 of the voltage detection wire housing portion 11 so that the wires housed in each of the wire housing grooves 111, 112, 113, 114 and 115 do not move up from the groove. Each of the projections 11T is formed by a tapered surface and a wall portion vertically extending from the side wall and is provided in a manner that the tapered surface protrudes downward from the side wall. Thus, the wire W can be housed smoothly into the wire housing groove 111, for example, whilst it becomes difficult to move up and extract the wire W thus housed within the wire housing groove 111 due to the presence of the vertically extended wall portion.

<Terminal Housing Chamber 12>

The terminal housing chamber 12 includes a first terminal housing chamber 121, a second terminal housing chamber 122 and a third terminal housing chamber 123 when seen from the connector 40 side in the figure. Each of the terminal housing chambers 121, 122 and 123 has a box shape of which upper face is opened and of which bottom portion is provided with a positive terminal hole 12P for penetrating the positive terminal 1P of the battery therethrough and a negative terminal hole 12N for penetrating the negative terminal 1N of the adjacent battery therethrough. The positive terminal 1P and the negative terminal 1N are coupled by a conductive metal plate 16 (see FIG. 3) to thereby form a series circuit of the battery and the adjacent battery. In the similar manner, when the positive terminal and the negative terminal within each of the remaining terminal housing chambers are coupled by the corresponding conductive metal plate 16, a series circuit of all the batteries is formed and so a high voltage DC voltage can be obtained.

In the related art, the first terminal housing chamber 121 and the second terminal housing chamber 122 are made in contact to each other. In contrast, according to the first embodiment, the first terminal housing chamber 121 and the second terminal housing chamber 122 adjacent thereto are disposed with a predetermined interval therebetween and are coupled by a U-shaped elastic coupling member 12U to each other. Since the interval between the first terminal housing chamber 121 and the second terminal housing chamber 122 can be adjusted by the shrink or expansion of the U-shaped elastic coupling member 12U, even if there is the tolerance of the battery pitch, the tolerance can be compensated by the U-shaped elastic coupling member 12U.

<Wire Extracting Portion 13>

In order to extract the voltage detection wire W for each cell of the lithium ion batteries without contacting to any of the remaining voltage detection wires W, the voltage detection wire extracting portion 13 is provided between the voltage detection wire housing portion 11 and the terminal housing chamber 12 and the voltage detection wire W is disposed therein. The voltage detection wire extracting portion 13 of the first terminal housing chamber 121 closest to the connector 40 side among the terminal housing chambers 121, 122 and 123 is coupled to the wire housing groove 111 closest to the terminal housing chamber side among the wire housing grooves 111, 112 and 113. The voltage detection wire extracting portion 13 of the second terminal housing chamber 122 secondly closest to the connector 40 side is coupled to the wire housing groove 112 secondly closest to the terminal housing chamber side, and the remaining wire extracting portions are respectively coupled to the remaining wire housing grooves in the similar manner. Thus, the voltage detection wires W can be respectively wired orderly into the wire housing grooves from the terminal housing chambers without crossing from one another.

<Wiring of Wires into Wiring Apparatus in FIG. 1>

When the wires are wired in the wiring apparatus shown in FIG. 1 thus configured, the wires are disposed as shown in the plan view of FIG. 2. That is, the voltage detection wires W are respectively housed into the wire housing grooves 111, 112 and 113 via the voltage detection wire extracting portions 13 from the terminal housing chambers 121, 122 and 123 in a manner that the voltage detection wires are orderly wired to the connector 40 side along the side walls of the respective grooves formed in parallel without directly contacting to each other respectively. Thus, since it can be recognized at a glance as to which one of the voltage detection wires W of the connector 40 side is coupled to which one of the batteries, the efficiency of the maintenance operation can be improved. Further, even if there is the tolerance of the battery pitch in one of the batteries, the tolerance can be compensated by the U-shaped elastic coupling members 11U, 11H or 12U.

<Attachment of Wiring Apparatus of FIG. 2 to Battery>

FIG. 3 is a perspective view of the wiring apparatus of FIG. 2 attached to the batteries.

In FIG. 3, the positive terminal 1P of the battery and the negative terminal 1N of the adjacent battery are coupled by the conductive metal plate 16. By repeating this coupling for all the batteries, all the batteries are coupled in series. The voltage detection wires W extracted from the terminal housing chamber 12 are respectively entered into the voltage detection wire housing portion 11 and then extended to the connector 40 side (FIG. 1) without directly contacting to each other.

<Effects of Wiring Apparatus of FIG. 2>

As described above, according to the first embodiment, the invention is effective in the case of the lithium ion batteries particularly. That is, the generation of the overcurrent of the batteries can be detected without coupling the overcurrent prevention resistor element for each battery. Further, the tolerance of the battery pitch can be compensated. Furthermore, it is not necessary to cover each of the wires by a protection member such as a corrugate or a tube and further it is also not necessary to bound and fix all the voltage detection wires each thus covered by a tape or a band. As a result, the invention can provide the wiring apparatus suitable for performing the maintenance operation in which the wires can be prevented from directly contacting to each other and it can be recognized at a glance as to which one of the voltage detection wires of the connector 40 side is coupled to which one of the batteries.

Second Embodiment

<Configuration of Wiring Apparatus According to Second Embodiment>

The feature of a second embodiment resides in that hinge portions are provided, each of which can partition the voltage detection wires W to each other so as not to directly contact mutually and compensate the design error by the shrink or expansion thereof while securing the insertion space of the connector on the coupling portion side of the connector 40.

FIGS. 4 to 6 are diagrams for explaining the wiring apparatus according to the second embodiment.

In FIGS. 4 and 5, there are shown the wiring apparatus 10 according to the first embodiment, a wiring apparatus 20 according to the second embodiment, a connector introducing portion 30 and the connector 40. The wiring apparatus 20 according to the second embodiment is configured in a manner that the entirety of a portion having grooves 21 continuing to the voltage detection wire housing portion 11 of the wiring apparatus 10 according to the first embodiment includes the hinge portions 22 each of which is bent in a W-shape. Since three bent portions of each of the W-shaped hinge portions 22 can shrink and expand, the design error can be compensated. In this embodiment, the W-shape indicates that each hinge portion 22 merely has three bent portions as shown in FIG. 4 regardless of shape such as rounded or sharp shape, and does not always mean that each top of the bent portions is sharp as the character 'W' shows.

<Merit of Wiring Apparatus According to Second Embodiment>

FIG. 6 is a perspective view showing a state where the voltage detection wires W extracted from the respective batteries are attached to a PCB assembly 50 via the apparatus according to the first embodiment and the wiring apparatus 20 according to the second embodiment by means of the connector 40. The voltage detection wires W extracted to the voltage detection wire housing portion 11 via the extracting ports from the terminal housing chambers are extended to the connector 40 orderly in parallel to each other without directly contacting therebetween. Even if there is the tolerance of the battery pitch as to a plurality of the batteries, such the tolerance of the battery pitch can be compensated by the U-shaped elastic coupling members 11U, 11H and 12U of the first embodiment. Further, even if there is the design error of the distance between the battery and the connector, such the design error can be compensated by the W-shaped hinge portion 22 of the second embodiment.

Further, since the attachment angle of the connector 40 can be changed by the W-shaped hinge portions 22, the attachment angle of the connector 40 can be coped flexibly.

Further, according to the wiring apparatus thus configured, since it can be recognized at a glance as to which one of the voltage detection wires W on the connector 40 side is coupled to which one of the batteries, the efficiency of the maintenance operation can be improved.

Furthermore, according to the wiring apparatus thus configured, the voltage detection wire W is extracted from each of the cells of the lithium ion batteries and the voltage detection wires W are sequentially coupled to the common voltage detection resistor element mounted on the printed circuit via the connector in a time-sharing manner. Then, the current flowing through the common voltage detection resistor element is compared by the CPU to determine whether or not an overcurrent is generated from the lithium ion batteries. According to such the configuration, it becomes possible to overcome the drawback (cost-up) of the configuration described in Patent Literature 1 that the number of the overcurrent prevention resistor elements is required to be same as the number of the lithium ion batteries. In this case, however, the voltage detection wire W is required for each of the cells of the lithium ion batteries. Thus, in order to prevent the predicted short-circuit due to the mutual contact between the voltage detection wires W, it may become necessary to cover each of the voltage detection wires W by the protection member such as a corrugate or a tube and further to bound and fix all the voltage detection wires each thus covered by a tape or a band. However, the present invention can eliminate such the troublesome procedures by employing the voltage detection wire housing portion configured in the aforesaid manner. As a consequence, it becomes unnecessary to cover each of the voltage detection wires by the protection member such as a corrugate or a tube and also unnecessary to bound and fix all the voltage detection wires each thus covered by a tape or a band.

REFERENCE SIGNS LIST 10 wiring apparatus according to first embodiment
11 voltage detection wire housing portion
11U U-shaped elastic coupling member of dividing groove 1D
11H horizontal U-shaped elastic coupling member of dividing groove 1D
11T projection (lock)
111, 112, 113 wire housing groove
12 terminal housing chamber
12U U-shaped elastic coupling member between terminal housing chambers
13 voltage detection wire extracting portion
20 wiring apparatus according to second embodiment
21 wire housing groove of wiring apparatus according to second embodiment
22 hinge portion
30 connector introducing portion
40 connector
50 PCB assembly
U U-shaped elastic coupling member
1D, 2D, 3D dividing groove
1F front side wall sandwiching dividing groove 1D 1R rear side wall sandwiching dividing groove 1D

The invention claimed is:

1. A wiring apparatus formed by a plastic molding and including a wire housing portion, terminal housing chambers and wire extracting portions, wherein
   the wire housing portion is provided with a plurality of elongated housing grooves that respectively house wires therein and that are disposed in parallel to each other, each of the housing grooves is divided into one or more pieces in a longitudinal direction, and adjacent end portions of each pair of adjacent divided pieces of the housing groove are coupled by a U-shaped elastic coupling member,
   each of the terminal housing chambers houses a conductive metal plate for coupling a terminal of a battery and a terminal of another battery adjacent thereto, and the terminal housing chambers are separately disposed along the longitudinal direction of the wire housing portion, and each pair of the adjacent terminal housing chambers disposed separately is coupled by a U-shaped elastic coupling member, and
   each of the wire extracting portions is arranged to couple corresponding one of the housing grooves and corresponding one of the terminal housing chambers to thereby extract one of the wires to the corresponding housing groove from the corresponding terminal housing chamber.

2. The wiring apparatus according to claim 1, wherein the wire housing portions are respectively provided with projections, each of which acts to lock and prevent the wire housed in the respective wire housing portions from being extruded therefrom.

3. The wiring apparatus according to claim 1, wherein each of the U-shaped elastic coupling members for coupling the adjacent end portions of each pair of adjacent divided pieces of the housing groove is respective one of a vertical coupling member for coupling upper end portions of the adjacent end portions and a horizontal coupling member for coupling side end portions of the adjacent end portions.

4. The wiring apparatus according to claim 1, wherein the wire housing portion is provided at a portion thereof to be coupled to a connector with a hinge portion which is formed to be bent in a W-shape having three bent portions when seen from a direction crossing the wire housing portion.

* * * * *